United States Patent
Yasutomi

(10) Patent No.: US 9,357,194 B2
(45) Date of Patent: May 31, 2016

(54) IMAGING APPARATUS FOR MINIMIZING REPETITIVE RECORDING OF MOVING IMAGE DATA OF A SIMILAR SCENE ON A RECORDING MEDIUM

(75) Inventor: Takeshi Yasutomi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/362,407

(22) Filed: Jan. 31, 2012

(65) Prior Publication Data

US 2012/0194691 A1    Aug. 2, 2012

(30) Foreign Application Priority Data

Feb. 2, 2011 (JP) .................................. 2011-021191

(51) Int. Cl.
*H04N 5/225* (2006.01)
*H04N 9/804* (2006.01)
*H04N 9/82* (2006.01)
*H04N 5/77* (2006.01)
*H04N 5/907* (2006.01)

(52) U.S. Cl.
CPC .............. *H04N 9/8042* (2013.01); *H04N 5/772* (2013.01); *H04N 5/907* (2013.01); *H04N 9/8211* (2013.01); *H04N 9/8227* (2013.01)
USPC ................... 348/220.1; 348/231.2; 348/231.3

(58) Field of Classification Search
CPC ........................... H04N 5/23245; H04N 5/343
USPC ..................................................... 348/220.1
See application file for complete search history.

(56) References Cited

U.S. PATENT DOCUMENTS

| | | | | |
|---|---|---|---|---|
| 7,417,667 B2 * | 8/2008 | Shibutani | ................... | 348/220.1 |
| 7,443,423 B2 * | 10/2008 | Yokonuma | ................. | 348/220.1 |
| 7,760,240 B2 * | 7/2010 | Won et al. | ................. | 348/220.1 |
| 7,847,827 B2 * | 12/2010 | Shin | ........................... | 348/220.1 |
| 7,889,243 B2 * | 2/2011 | Mizutani | ................... | 348/222.1 |
| 8,437,623 B2 * | 5/2013 | Ohnishi | ....................... | 386/328 |
| 2002/0093571 A1 * | 7/2002 | Hyodo | ......................... | 348/220 |
| 2004/0109067 A1 * | 6/2004 | Yokoi | ........................ | 348/220.1 |
| 2004/0189824 A1 * | 9/2004 | Shibutani | ................... | 348/231.2 |
| 2004/0202456 A1 * | 10/2004 | Sasagawa | ..................... | 386/120 |
| 2005/0157184 A1 * | 7/2005 | Nakanishi et al. | ........ | 348/220.1 |
| 2008/0068469 A1 * | 3/2008 | Takagi et al. | ............ | 348/231.2 |
| 2009/0033754 A1 * | 2/2009 | Yoshikawa | ................ | 348/220.1 |
| 2009/0322895 A1 * | 12/2009 | Miyata | ....................... | 348/222.1 |
| 2011/0221916 A1 * | 9/2011 | Kuriyama | ................. | 348/220.1 |

FOREIGN PATENT DOCUMENTS

| | | |
|---|---|---|
| CN | 1658669 A | 8/2005 |
| CN | 1692631 A | 11/2005 |
| CN | 1731844 A | 2/2006 |
| CN | 1856022 A | 11/2006 |
| CN | 101360210 A | 2/2009 |
| CN | 101621617 A | 1/2010 |
| CN | 101834987 A | 9/2010 |
| JP | 2002-218384 A | 8/2002 |
| JP | 2009-038649 A | 2/2009 |

\* cited by examiner

*Primary Examiner* — Twyler Haskins
*Assistant Examiner* — Dwight C Tejano
(74) *Attorney, Agent, or Firm* — Canon U.S.A., Inc. IP Division

(57) ABSTRACT

A controller determines whether a predetermined condition is satisfied and, in response to a recording instruction, controls a recorder to record still image data on a recording medium, and in a case that the predetermined condition is determined to be satisfied, the controller controls the recorder not to record the moving image data on the recording medium.

13 Claims, 5 Drawing Sheets

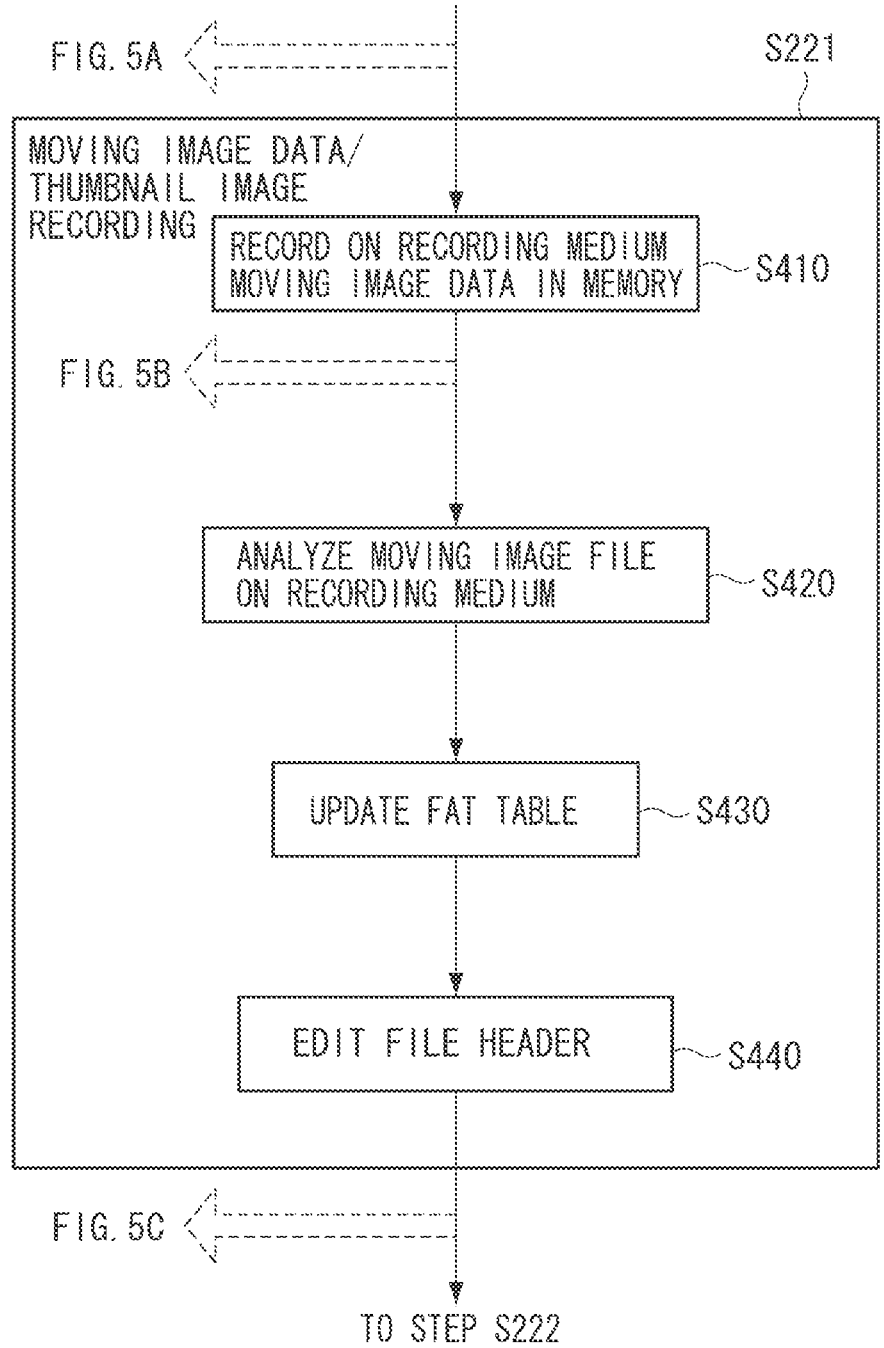

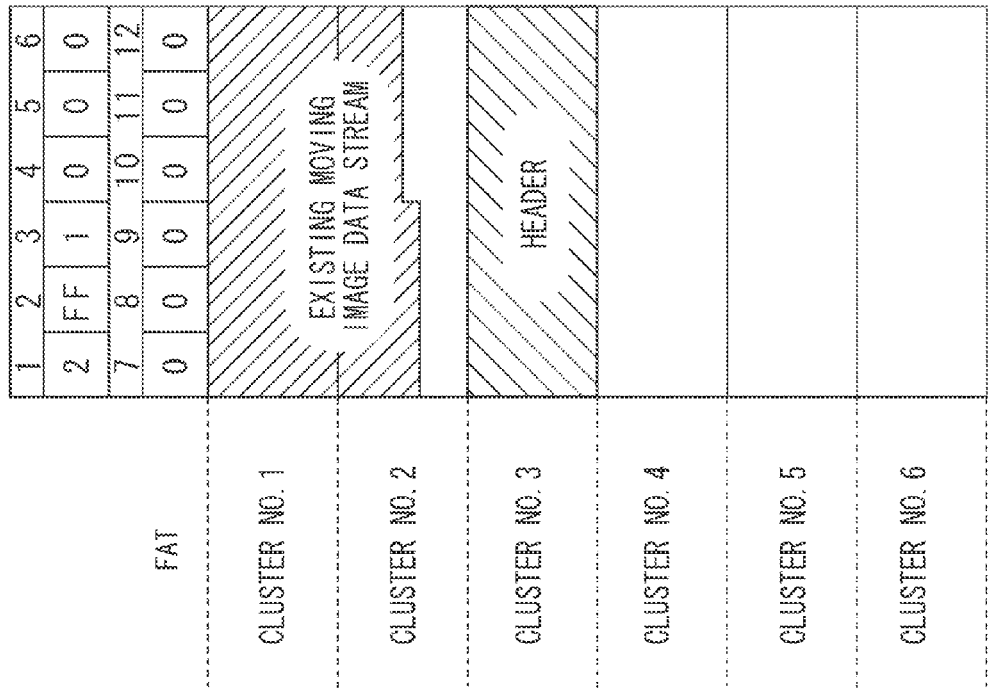

IMAGING APPARATUS FOR MINIMIZING REPETITIVE RECORDING OF MOVING IMAGE DATA OF A SIMILAR SCENE ON A RECORDING MEDIUM

BACKGROUND OF THE INVENTION

1. Field of the Invention

The present invention relates to an imaging apparatus.

2. Description of the Related Art

Conventionally, an imaging apparatus is provided with a function of generating moving image data from a captured image and recording the moving image data on a recording medium such as a memory card. In such an imaging apparatus, an imaging apparatus capable of adding newly captured moving image data to moving image data stored in an existing moving image file recorded on a recording medium has appeared in recent years, as discussed in Japanese Patent Application Laid-Open No. 2002-218384.

However, with the technique discussed in Japanese Patent Application Laid-Open No. 2002-218384, connecting newly captured moving image data to moving image data in an existing moving image file causes similar moving images to be connected and recorded, for example, if shooting is repetitively performed at the same place. There has been an issue that, when such moving images are viewed, similar scenes are reproduced for awhile and a viewer may lose interest. Further, there has been an issue that, even if moving image data is not connected, similar moving images are repetitively viewed and the viewer may lose interest.

SUMMARY OF THE INVENTION

The present invention relates to an imaging apparatus capable of minimizing the repetitive recording of moving image data of a similar scene on a recording medium.

According to an aspect of the present invention, an imaging pickup apparatus includes an imaging pickup unit that captures an image of a subject, a still image generator that generates still image data based on an image signal acquired by the imaging pickup unit, a moving image generator that generates moving image data based on an image signal acquired by the imaging pickup unit, a recorder that records the still image data and the moving image data on a recording medium, and a controller that controls the recorder, wherein the controller determines whether a predetermined condition is satisfied and, in response to a recording instruction, controls the recorder to record the still image data on the recording medium, and in a case that the predetermined condition is determined to be satisfied, the controller controls the recorder not to record the moving image data on the recording medium.

According to the present invention, an imaging apparatus can avoid, when a predetermined condition is satisfied, repetitively recording moving image data of a similar scene on the recording medium by not connecting moving image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating control processing for connecting (adding) moving image data.

FIGS. 5A to 5C illustrate state transitions of a moving image file by the connection (addition) of moving image data.

DESCRIPTION OF THE EMBODIMENTS

Figure 1:
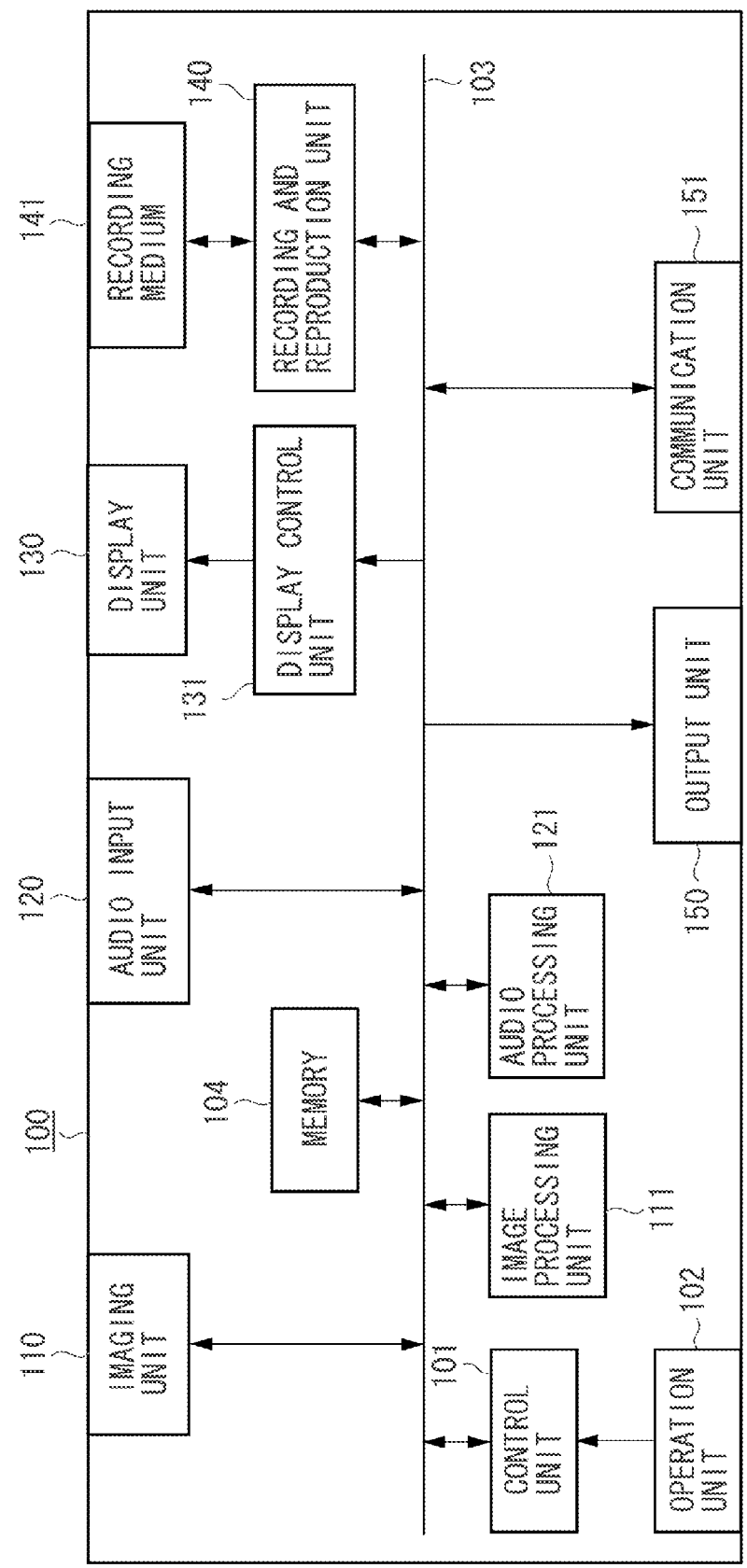
FIG. 1 illustrates a configuration of an imaging apparatus according to a first exemplary embodiment.

Various exemplary embodiments, features, and aspects of the invention will be described in detail below with reference to the drawings.

A first exemplary embodiment will be described below based on an imaging apparatus capable of capturing a moving image. In a regular "moving image shooting mode", the imaging apparatus according to the present exemplary embodiment can record moving image data pieces captured from the start to end of a single moving image shooting operation on a recording medium as one file.

In a regular "still image shooting mode", the imaging apparatus according to the present exemplary embodiment can record still image data pieces captured in response to one shooting instruction on the recording medium as one file.

Further, the imaging apparatus according to the present exemplary embodiment has a "movie digest mode". In the movie digest mode, in response to a still image shooting instruction, the imaging apparatus can record the moving image data of a predetermined time length, which is captured before the still image shooting instruction is input, on the recording medium as a moving image file in addition to recording of the captured still image data on the recording medium. The imaging apparatus temporarily stores the moving image data in a memory included therein.

In the "movie digest mode", the imaging apparatus according to the present exemplary embodiment can connect all moving image data pieces captured, for example, on the same date to generate one piece of moving image data, and recording the resultant data on the recording medium. In this case, each time the still image shooting instruction is input, the imaging apparatus connects (adds) newly captured moving image data to the moving image data in the moving image file already recorded on the recording medium.

In the present exemplary embodiment, the "movie digest mode", the "moving image shooting mode", and the "still image shooting mode" may be referred to as a "first shooting mode", a "second shooting mode", and a "third shooting mode" respectively.

In particular, when the imaging apparatus according to the present exemplary embodiment enters the "movie digest mode", it generates encoded moving image data by using a plurality of images acquired by an imaging unit as images for respective frames of the moving image, and sequentially stores the encoded moving image data in the memory. If a specified time period or more has elapsed since the moving image data was stored in the memory, the imaging apparatus discards or overwrites the moving image data on the memory.

Then, in response to an input of the still image shooting instruction, the imaging apparatus generates still image data based on an image signal acquired by the imaging unit, and records the still image data on the recording medium. At that time, the imaging apparatus records on the recording medium as a moving image file the moving image data of the predetermined time length that has been stored in the memory so far.

When the moving image data of the predetermined time length is connected to the moving image data of the moving image file that is already recorded on the recording medium (existing moving image file), the imaging apparatus first records on the recording medium the moving image data of the predetermined time length temporarily stored in the memory. Subsequently, the imaging apparatus analyzes the moving image data of the existing moving image file to identify a connecting position, and connects the moving image data. Thus, since the moving image data storage area in the memory is released without waiting for the end of analyzing the existing moving image file, the imaging apparatus according to the present exemplary embodiment is ready for capturing subsequent moving image data without waiting for a prolonged period of time.

The imaging apparatus according to the present exemplary embodiment uses a recording medium formatted according to a file system which records data based on a file allocation table (FAT). (In the present exemplary embodiment, a file system based on FAT32 is used.) When the above-described connection of the moving image data is performed, the imaging apparatus edits the file allocation table. Thus, the imaging apparatus can easily add and separate the moving images to/from one another.

To avoid recording moving image data of similar scenes, when recording moving image data in the "movie digest mode", the imaging apparatus according to the present exemplary embodiment does not record the moving image data on the recording medium when a predetermined condition is satisfied. For example, if a recording instruction is input within a predetermined fixed time period since when the moving image data was last recorded on the recording medium, the imaging apparatus does not record the moving image data on the recording medium. Further, the imaging apparatus does not record the moving image data either when it is in the same mode as the one in which the moving image data was last recorded, when the audio level is equal to or below a certain level, or when the moving image is a motionless image.

Such an imaging apparatus will be described below.

An overall configuration of an imaging apparatus 100 according to the present exemplary embodiment will be described below with reference to FIG. 1. Referring to FIG. 1, a control unit 101 includes, for example, a central processing unit (CPU) such as a microprocessor unit (MPU), and a memory such as a dynamic random access memory (DRAM), and a static random access memory (SRAM). In response to an operation signal from an operation unit 102 which accepts an operation by a user, the control unit 101 executes various operations (programs) to control each unit in the imaging apparatus 100 or data transfer between units. The control unit 101 may be a microcomputer including a CPU and a memory.

The operation unit 102 is provided with switches for inputting various operations related to image shooting, such as a power source button, a recording start button, a zoom adjustment button, and an auto-focusing button. The operation unit 102 is also provided with a menu display button, a determination button, cursor keys, a pointing device, and a touch panel. Each time the user operates these keys and buttons, the operation unit 102 transmits a relevant operation signal to the control unit 101.

A bus 103 is a general-purpose bus for transmitting various data pieces, control signals, and instruction signals to each unit in the imaging apparatus 100.

The imaging unit 110, while controlling a light quantity through a diaphragm, converts a subject's optical image captured through a lens into an analog image signal by an image sensor such as a charge-coupled device (CCD) sensor and a complementary metal-oxide semiconductor (CMOS) sensor. Then, the imaging unit 110 converts the analog image signal to a digital image signal and transmits the digital image signal to a memory 104 for temporary storage.

An image processing unit 111 performs processing required for image recording and reproduction. More specifically, the image processing unit 111 is a microcomputer which includes a program for executing the following operations. Further, the image processing unit 111 may execute the following operations as functions of the control unit 101. The image processing unit 111 applies image quality adjustment processing to the digital image signal acquired by the imaging unit 110 and then stored in the memory 104. In the image quality adjustment processing, the white balance, color, brightness, and the like are adjusted based on user-set setting values and setting values determined based on the image characteristics.

The image processing unit 111 further performs processing for generating moving image data based on image signals of a plurality of frames having undergone the image quality adjustment processing. The image processing unit 111 according to the present exemplary embodiment may generate compressed and encoded moving image data by applying intra-frame coding to each frame of the moving image data. Also, the image processing unit 111 may generate compressed and encoded moving image data by utilizing a difference and motion prediction between a plurality of frames of the moving image data. For example, the image processing unit 111 can generate moving image data based on known compressing and encoding methods such as Motion Joint Photographic Experts Group (MotionJPEG), Moving Picture Experts Group (MPEG), and H.264 (MPEG4-Part10 Advanced Video Coding (AVC)).

Generally, frame image data having undergone intra-frame coding is referred to as I picture. Image data having undergone intra-frame coding with using a difference from the preceding frame is referred to as P picture. Image data having undergone intra-frame coding with using differences from the preceding and following frames is referred to as B picture. The compression methods used in the image processing unit 111 are the known compression methods and not related to the features of the present invention, and therefore the descriptions thereof will be omitted.

The image processing unit 111 can perform processing for generating still image data based on the image signal having undergone the image quality adjustment processing. The image processing unit 111 uses the general compressing and encoding methods such as JPEG to generate still image data. The compressing and encoding methods used in the image processing unit 111 are the known compression methods and not related to the features of the present invention, and therefore the descriptions thereof will be omitted. The still image data may be RAW image data with which a digital image signal acquired by the imaging unit 110 is recorded as is. In other words, the image processing unit 111 can generate moving image and still image.

The moving image data and still image data generated by the image processing unit 111 are stored in areas other than the above-described area storing the digital image signal in the memory 104. Although the present exemplary embodiment will be described below on the premise that the digital image signal acquired by the imaging unit 110 and the moving image data and still image data generated by the image processing unit 111 are stored in the same memory 104, these data pieces may be stored in different memories.

An audio input unit 120 collects sound around the imaging apparatus 100 by, for example, a built-in non-directional microphone or an external microphone connected via an audio input terminal, converts the acquired analog audio signal to a digital image signal, and transmits the digital image signal to the memory 104 for temporary storage.

An audio processing unit 121 performs processing required for audio recording and reproduction. More specifically, the audio processing unit 121 is a microcomputer which includes a program for executing the following operations. Further, the audio processing unit 121 may execute the following operations as functions of the control unit 101. The audio processing unit 121 applies level optimization processing and noise reduction processing to the digital audio signal acquired by the audio input unit 120 and then stored in the memory 104. The audio processing unit 121 compresses the audio signal as required. The audio processing unit 121 uses generally known audio compression methods such as audio code number 3 (AC3) and advanced audio coding (AAC) which are not related to the features of the present invention, and therefore descriptions thereof will be omitted.

The audio data generated by the audio processing unit 121 is stored in the memory 104 again.

A display control unit 131 is a microcomputer which controls image display on a display unit 130. More specifically, the display control unit 131 reads a digital image signal temporarily stored in the memory 104 and displays a relevant image on the display unit 130. The display unit 130 may be a liquid crystal panel or an organic electroluminescence (EL) panel mounted on the imaging apparatus 100 or a display unit (a television, a monitor, a projector, etc.) different from the one of the imaging apparatus 100.

The control unit 101 reads moving image data and audio data stored, for example, in the memory 104, and transmits the moving image data and the audio data to the recording and reproduction unit 140. The recording and reproduction unit 140 records the transferred moving image data and audio data on a recording medium 141. The recording and reproduction unit 140 records the moving image data and the audio data on the recording medium 141 as one moving image file. In this case, the control unit 101 may generate various types of data indicating camera settings at the time of shooting and detected data, and record these generated data pieces together with the moving image data and the audio data on the recording medium 141.

The recording medium 141 may be a recording medium built in the imaging apparatus 100 or a removable recording medium. For example, the recording medium 141 includes all types of recording media such as a hard disk, an optical disc, a magneto-optical disk, a compact disc recordable (CD-R), a digital versatile disc recordable (DVD-R), a magnetic tape, a nonvolatile semiconductor memory, and a flash memory.

When recording a still image file, the control unit 101 reads the still image data stored in the memory 104 and transmits it to the recording and reproduction unit 140. The recording and reproduction unit 140 records the transmitted still image data on the recording medium 141 as a still image file.

The recording and reproduction unit 140 also reads (reproduces) the moving image file recorded on the recording medium 141. Then, the control unit 101 controls the recording and reproduction unit 140 to read, for example, header information of the moving image included in the read moving image file and, based on the header information, to read the moving image data and the audio data to be reproduced from the recording medium 141. The recording and reproduction unit 140 transmits the read moving image data to the image processing unit 111 and the reproduced audio data to the audio processing unit 121.

The image processing unit 111 sequentially stores an image of one frame of reproduced moving image data in the memory 104. Then, the display control unit 131 sequentially reads an image of one frame stored in the memory 104, and displays the read image on the display unit 130. In the meantime, the audio processing unit 121 decodes a digital audio signal from the reproduced audio data, converts the digital audio signal to an analog signal, and outputs the analog audio signal to an audio output unit (not illustrated) such as a speaker, an earphone terminal, and an audio output terminal.

When reproducing a still image, the recording and reproduction unit 140 reads (reproduces) the still image file recorded on the recording medium 141. Then, the control unit 101 transmits the still image data included in the read still image file to the image processing unit 111. The image processing unit 111 stores the image of the still image data in the memory 104. Then, the display control unit 131 sequentially reads the image of one frame stored in the memory 104, and displays the read image on the display unit 130.

An output unit 150 includes an audio terminal and a video terminal for outputting an audio signal and an image signal, respectively, to an external device. A communication unit 151 transmits and receives data to/from an external device via wired and wireless connections.

Although the imaging apparatus 100 according to the present exemplary embodiment records a moving image file, for example, in the "QuickTime (registered trademark) format", any file format can be used.

The present exemplary embodiment will be described below on the premise that the file management system of the recording medium 141 is based on the FAT file system generally used for built-in devices. Since the technique of the FAT file system itself is widely known, descriptions will be made only for characteristic operations of the present exemplary embodiment. Further, the new technology file system (NTFS) format and extended FAT (exFAT) format, which are FAT file formats, may be used.

The physical memory area in the recording medium 141, for example, a flash memory is managed by a built-in microcomputer of the imaging apparatus 100. With respect to an access from the recording and reproduction unit 140 of the imaging apparatus 100, the data pieces seem to be logically stored by the FAT file system.

As described above, the imaging apparatus 100 according to the present exemplary embodiment is provided with the "movie digest mode (first shooting mode)", the "moving image shooting mode (second shooting mode)", and the "still image shooting mode (third shooting mode)".

Regular operations performed by the imaging apparatus 100 according to the present exemplary embodiment will be described below.

With the imaging apparatus 100 according to the present exemplary embodiment, when a user operates the power button on the operation unit 102, the operation unit 102 issues an activation instruction to the control unit 101. In response to the activation instruction, the control unit 101 controls a power supply unit (not illustrated) to supply the power to each unit of the imaging apparatus 100.

When the power is supplied, the control unit 101 confirms, for example, the current mode setting of a mode selector switch on the operation unit 102, such as the "still image shooting mode", the "moving image shooting mode", the "reproduction mode", and the "digest movie mode", based on an instruction signal from the operation unit 102.

In the "still image shooting mode", the imaging apparatus 100 captures an image when the user operates a still image recording button on the operation unit 102 in the shooting standby state, and a still image file is recorded on the recording medium 141. Then, the imaging apparatus 100 returns to the shooting standby state.

In the "moving image shooting mode", the imaging apparatus 100 starts shooting when the user operates a moving image recording start button on the operation unit 102 in the shooting standby state. In the meantime, moving image data and audio data are recorded on the recording medium 141. When the user operates a moving image recording end button on the operation unit 102, the shooting ends, and the moving image data and the audio data recorded on the recording medium 141 are completed as a moving image file. Subsequently, the imaging apparatus 100 returns to the shooting standby state.

In the "reproduction mode", the imaging apparatus 100 reproduces from the recording medium 141 a still image file or a moving image file related to a file selected by the user to output the relevant still image, moving image, and sound. The "digest movie mode" will be described below.

First, the "still image shooting" mode will be described below. When the still image shooting mode is set on the operation unit 102, the control unit 101 first instructs each unit of the imaging apparatus 100 to enter the shooting standby state as described above.

In the shooting standby state, the display control unit 131 reads a digital image signal temporarily stored in the memory 104, and displays an image related to the read image signal on the display unit 130. The user can prepare for shooting while monitoring the image displayed on the screen in this way.

When the user operates the still image recording button on the operation unit 102 and a shooting instruction signal is transmitted in the shooting standby state, the control unit 101 transmits a shooting control signal to each unit of the imaging apparatus 100 to control each unit to perform the following operations.

The imaging unit 110 converts a subject's optical image captured through a lens into an analog image signal by an image sensor, converts the analog image signal to a digital image signal, and temporarily stores the digital image signal in the memory 104. The image processing unit 111 applies the image quality adjustment processing (adjustment of white balance, color, brightness, etc.) to the digital image signal stored in the memory 104 based on setting values. Then, the display control unit 131 reads the digital image signal processed by the image processing unit 111, and displays a relevant image on the display unit 130. The user can confirm the captured still image by monitoring the image displayed on the display unit 130.

Then, the image processing unit 111 reads the image signal temporarily stored in the memory 104, applies predetermined encoding processing to the image signal to generate still image data (still image acquisition), and outputs the still image data to the recording and reproduction unit 140. The recording and reproduction unit 140 writes the still image data to the recording medium 141 as a still image file under the control of a file system such as the universal disk format (UDF) and FAT.

Upon completion of the encoding operation by the image processing unit 111, the control unit 101 transmits a control signal to each unit of the imaging apparatus 100 to shift to the shooting standby state. Then, the imaging apparatus 100 returns to the shooting standby state.

The "moving image shooting mode" will be described below. When the moving image shooting mode is set on the operation unit 102, the control unit 101 first instructs each unit of the imaging apparatus 100 to enter the shooting standby state as described above.

In shooting standby state, the display control unit 131 reads the digital image signal sequentially stored in the memory 104, and displays a relevant image on the display unit 130. The user can prepare for shooting while monitoring the image displayed on the screen in this way.

When the user operates the moving image recording start button on the operation unit 102 and a shooting start instruction signal is transmitted in the shooting standby state, the control unit 101 transmits a shooting start control signal to each unit of the imaging apparatus 100 to control each unit to perform the following operations.

The imaging unit 110 converts a subject's optical image captured through a lens into an analog image signal by the image sensor, converts the analog image signal to a digital image signal, and sequentially stores the digital image signal in the memory 104. The image processing unit 111 applies the image quality adjustment processing (adjustment of white balance, color, brightness, etc.) to the digital image signal temporarily stored in the memory 104 based on setting values. The display control unit 131 reads the digital image signal having undergone the image adjustment processing stored in the memory 104, and displays a relevant image on the display unit 130.

In the meantime, the audio input unit 120 converts an analog audio signal acquired by the microphone to a digital audio signal, and stores the acquired digital audio signal in the memory 104. The audio processing unit 121 applies level optimization processing to the digital audio signal stored in the memory 104, and outputs the digital audio signal. When compressing the audio signal, the audio processing unit 121 applies compression processing to the audio signal.

Then, the image processing unit 111 and the audio processing unit 121 read the image signal and the audio signal, respectively, which are temporarily stored in the memory 104, and apply predetermined encoding processing to respective signals to generate moving image data and audio data. Then, the control unit 101 combines the moving image data with the audio data to form a data stream, and outputs the data stream to the recording and reproduction unit 140. The recording and reproduction unit 140 writes the data stream to the recording medium 141 as one moving image file under the control of the file system such as the UDF and the FAT.

When the audio signal is not to be compressed, the control unit 101 outputs the audio signal generated by the audio processing unit 121 together with the moving image data generated by the image processing unit 111 to the recording and reproduction unit 140. Then, the recording and reproduction unit 140 writes the data stream to the recording medium 141 as one moving image file under the control of the file system such as the UDF and the FAT, as described above.

The imaging apparatus 101 continues the above-described operations during the shooting operation.

During the shooting operation, the control unit 101 is transmitting various control signals to the imaging unit 110, the image processing unit 111, the audio processing unit 121, etc. in response to a user operation on the operation unit 102 or according to the result of analyzing the image signal generated by the image processing unit 111. For example, the control unit 101 transmits control signals for lens movement and diaphragm adjustment to the imaging unit 110, and control signals for image and audio adjustments to the image processing unit 111 and the audio processing unit 121, respectively.

During the shooting operation, similarly, when the user operates the zoom key on the operation unit 102, the control unit 101 activates an "optical zoom" function of the imaging unit 110 and an "electronic zoom" function of the image processing unit 111. Further, based on an acceleration signal detected by a vibration detection unit (not illustrated), the control unit 101 activates an "optical image stabilization" function of the imaging unit 110 and an "electronic image stabilization" function of the image processing unit 111.

Then, when the user operates the moving image recording end button on the control unit 110 and then a shooting end instruction signal is transmitted to the control unit 101, the control unit 101 transmits a shooting end control signal to each unit of the imaging apparatus 100 to control each unit to perform the following operations.

The image processing unit 111 and the audio processing unit 121 read the remaining image signals and audio signals stored in the memory 104, and apply predetermined encoding processing to these signals to generate moving image data and audio data, respectively.

As the final moving image data and audio data, the control unit 101 forms a data stream and outputs it to the recording and reproduction unit 140. When the audio data is not to be compressed, the control unit 101 outputs the audio data generated by the audio processing unit 121 and the moving image data to the recording and reproduction unit 140.

The recording and reproduction unit 140 writes the data stream to the recording medium 141 as one moving image file under the control of the file system such as the UDF and the FAT. When data stream supply stops, the control unit 101 controls each unit to perform the following operations to generate a thumbnail.

Subsequently, the recording and reproduction unit 140 reads moving image data of a first frame of the moving image file recorded on the recording medium 141, and transmits the moving image data to the image processing unit 111. The image processing unit 111 temporarily stores the moving image data in the memory 104, and decodes the moving image data by predetermined procedures.

Then, the image processing unit 111 applies predetermined encoding processing for thumbnail to the acquired image signal to generate a compressed image signal for thumbnail. Then, the control unit 101 outputs the compressed image signal for thumbnail to the recording and reproduction unit 140. Under the control of the file system such as the UDF and the FAT, the recording and reproduction unit 140 writes the compressed image for thumbnail to the recording medium 141 to be combined with the original moving image file to form a moving image file, and stops the recording operation.

When the recording operation stops, the control unit 101 transmits a control signal to each unit of the imaging apparatus 100 to shift to the shooting standby state. Then, the imaging apparatus 100 returns to the shooting standby state.

The reproduction mode will be described below. When the reproduction mode is set on the operation unit 102, the control unit 101 transmits a control signal to each unit of the imaging apparatus 100 to shift to the reproduction state. Each unit performs the following operations.

The reproduction mode will be described below. When the reproduction mode is set on the operation unit 102, the control unit 101 transmits a control signal to each unit of the imaging apparatus 100 to shift to the reproduction state. Each unit performs the following operations. The control unit 101 transmits the read compressed image signal and compressed audio signal to the image processing unit 111 and the audio processing unit 121, respectively. The control unit 101 transmits the uncompressed audio signal to the output unit 150.

The image processing unit 111 and the audio processing unit 121 temporarily store the compressed image signal and the compressed audio signal in the memory 104, respectively, and decode respective signals with predetermined procedures. Then, the control unit 101 transmits the decoded audio signal and the decoded image signal to the output unit 150 and the display control unit 131, respectively.

The display control unit 131 displays an image related to the input image signal on the display unit 130. An audio output line of the output unit 150 outputs sound related to the input audio signal to a built-in speaker, a connected earphone, or a connected speaker.

Figure 2:
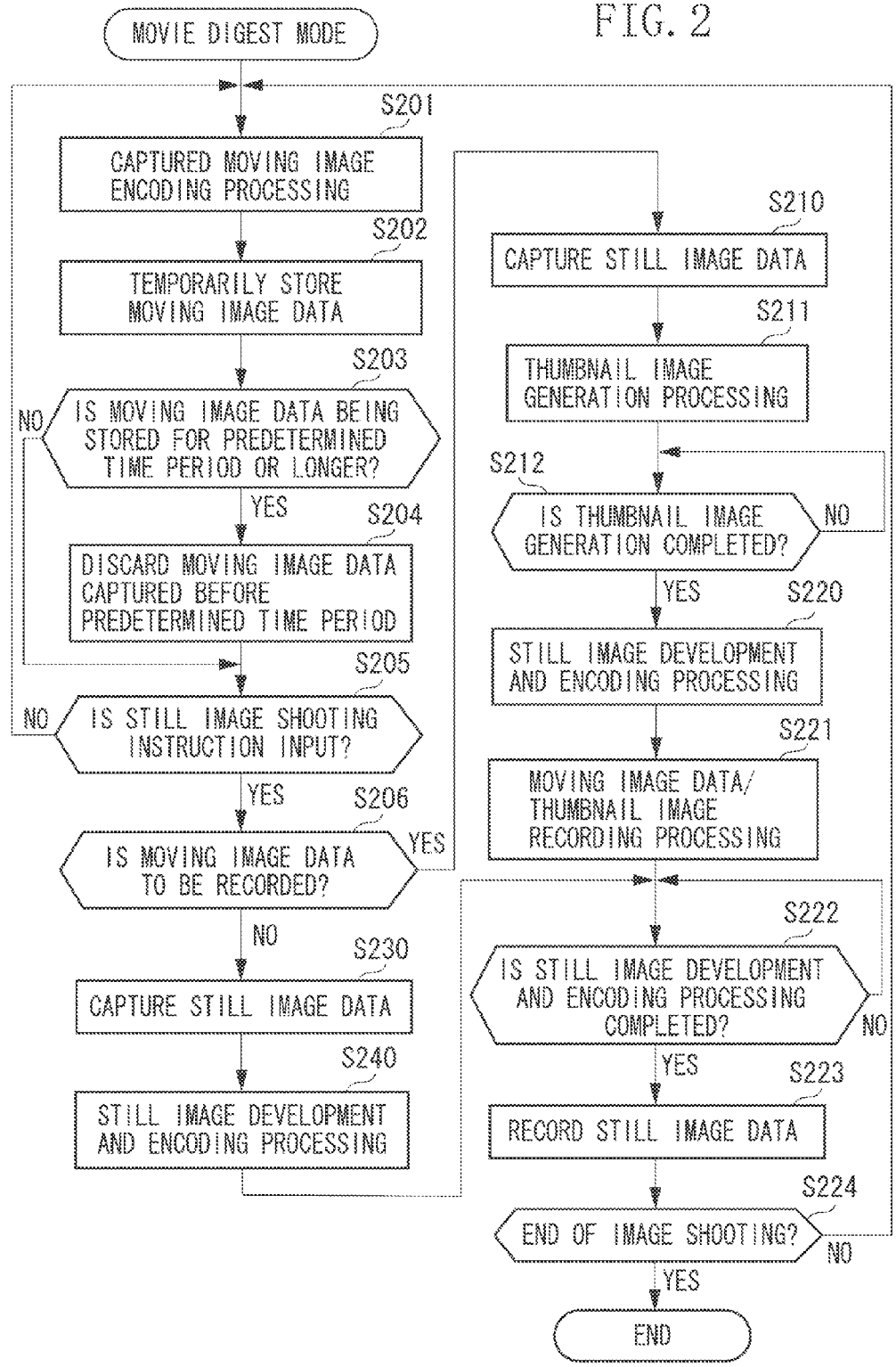
FIG. 2 is a flowchart illustrating control of the imaging apparatus in a digest movie mode.

The "digest movie mode" will be described below with reference to the flowchart in FIG. 2. Processing in the flowchart in FIG. 2 is started when the imaging apparatus 100 is set in the movie digest mode. The control unit 101 controls each unit of the imaging apparatus 100 to execute the processing.

In the present exemplary embodiment, the control unit 101 determines whether the moving image data is to be sequentially connected (added) after the still image recording instruction is input and before the moving image data is recorded on the recording medium 141. The control unit 101 reads from the recording and reproduction unit 140 the moving image file captured last in the movie digest mode, and checks information about the shooting date. If the read moving image file was captured on the current date, the control unit 101 adds the moving image file to the moving image data. Otherwise, if the read moving image file was captured not on the current date, the control unit 101 does not add the moving image file to the moving image data.

A moving image captured in the movie digest mode has a file name composed of, for example, an "MDG" identifier and a 4-digit serial integer number which is automatically incremented. The identifier "MDG" indicates that the moving image was captured in the movie digest mode. Such a file name makes it easier to identify that a moving image having a file name composed of the "MDG" identifier and the largest number recorded on the recording medium 141 is captured last. Conditions for adding moving image data or not will be described below. The control unit 101 may determine whether the moving image data is to be added when the imaging apparatus 100 is activated or when the movie digest mode is selected.

The present exemplary embodiment will be described below on the premise that a thumbnail image is generated each time the still image shooting instruction is input. In this case, a plurality of thumbnail images will be related to the added moving image file. However, a thumbnail image may be generated only when a new moving image file is generated but not generated when the moving image data is added.

When the digest movie mode is set on the operation unit 102, the control unit 101 controls each unit of the imaging apparatus 100 to perform the following operations.

In step S201, the imaging unit 110 first transmits the acquired digital image signal to the memory 104 for temporary storage. Then, the display control unit 131 reads the digital image signal stored in the memory 104, and displays a relevant image on the display unit 130. Further, the image processing unit 111 sequentially reads the digital image signal stored in the memory 104 and applies encoding processing to the digital image signal to generate moving image data.

At the same time, the control unit 101 instructs the audio processing unit 121 to apply various types of adjustment processing to the input digital audio signal, applies encoding processing to the audio signal based on a predetermined audio encoding method, and stores the acquired encoded audio signal in the memory 104.

In step S202, the image processing unit 111 and the audio processing unit 121 respectively store the encoded moving image data and audio data in the memory 104. The following explanations will be made on the premise that audio data is processed together with the moving image data, and descriptions of the audio data will be omitted.

The imaging apparatus 100 according to the present exemplary embodiment deletes the moving image data captured previous to a specified time period among the moving image data pieces stored in the memory 104 so that only the moving image data of the last predetermined time length is constantly stored in the memory 104.

Therefore, in step S203, the control unit 101 determines whether the moving image data of the predetermined time length or longer has been stored in the memory 104. When the control unit 101 determines that moving image data of the predetermined time length or longer has been stored in the memory 104 (YES in step S203), the processing proceeds to step S204. In step S204, the control unit 101 discards the moving image data captured previous to the specified time period. Since the size of the data to be deleted is determined by an encoding unit, the size of the data to be deleted can be determined as the number of frames or reproducing time according to the encoding method.

When the control unit 101 determines that moving image data of the predetermined time length or longer has not been stored (NO in step S203), the control unit 101 does not discard the moving image data. Although, in the present exemplary embodiment, the predetermined time length may be any time length, the user may select a value, for example, 4 seconds, 6 seconds, 8 seconds, or the like.

In step S205, the control unit 101 determines whether the still image shooting instruction is input from the operational input unit 112. When the still image shooting instruction is not input (NO in step S205), the processing returns to step S201 to continue the processing for generating and temporarily storing moving image data.

Although the present exemplary embodiment is described below on the premise that moving image data of the last predetermined time length is constantly stored in the memory 104, the embodiment of the present invention is not limited thereto. More specifically, it is preferable that the size of the moving image data to be stored in the memory 104 is quantitatively determined. For example, the size may be predetermined by the number of frames, the number of group of pictures (GOPs), or the data size.

More specifically, when the size of the moving image data stored in the memory 104 reaches a predetermined value, frames of moving image data may be sequentially deleted from the memory 104, starting from a frame having the oldest shooting time, until the size of the moving image data stored therein falls below the predetermined value.

When the still image shooting instruction is input (YES in step S205), the processing proceeds to step S206. In step S206, the control unit 101 determines whether the moving image data is to be recorded.

In the present exemplary embodiment, when any one of predetermined conditions (described below) is satisfied, the moving image data temporarily stored in the memory 104 is not to be recorded on the recording medium 141 (NO in step S206). Otherwise, when the predetermined conditions are not satisfied, the moving image data is to be recorded on the recording medium 141 (YES in step S206). The predetermined conditions used in step S206 will be described below.

When the control unit 101 determines that the moving image data is to be recorded (YES in step S206), the processing proceeds to step S210. In step S210, the control unit 101 instructs the imaging unit 110 to capture still image data.

In step S211, in parallel with the above-described operation, the control unit 101 instructs the image processing unit 111 to decode the image of the first frame of the moving image data stored in the memory 104, and perform thumbnail image generation processing. Although the present exemplary embodiment is described on the premise that a thumbnail image of the moving image data to be recorded is generated from the image of the first frame, the embodiment of the present invention is not limited thereto. A thumbnail image may be generated from an image of any one frame of the moving image data to be recorded.

More specifically, when the still image shooting instruction is input, a thumbnail image may be generated using anyone frame of the moving image data stored in the memory 104. Accordingly, a thumbnail of moving image data can be generated without reading a moving image file from the recording medium after completion of the moving image data recording thereon, resulting in improved processing speed. When the control unit 101 determines that the still image shooting instruction is input (YES in step S205), the control unit 101 controls each unit not to further accept the still image shooting instruction.

In step S212, the control unit 101 determines whether the image processing unit 111 completes the thumbnail image generation processing. When the image processing unit 111 completes the thumbnail image generation processing (YES in step S212), the processing proceeds to step S220. In step S220, the control unit 101 instructs the image processing unit 111 to sequentially apply the development processing and the encoding processing to the digital image signal captured in step S210 to convert it into still image data.

In step S221, in parallel with the above-described operation, the control unit 101 includes the thumbnail image generated by the thumbnail generation processing in the header information of the encoded moving image data temporarily stored in the memory 104, and records the moving image data on the recording medium 141.

The still image development processing in step S220 includes the "demosaic" processing. The "demosaic" processing collects insufficient color information for each pixel from pixels therearound to complement color information and forms a full-color image at the time of shooting. The still image development processing may also include the gamma correction and white balance adjustment processing.

Upon completion of the above-described development processing, the control unit 101 stores again the developed digital image data in the memory 104, and instructs the display control unit 131 to read the digital image data therefrom and display a relevant image on the display unit 130. This operation is what is referred to as "Rec review" display for a digital camera with which a captured image is displayed on the display unit 130 immediately after shooting.

The display unit 130 displays no image (black screen) since the time when the still image shooting instruction is input until the time when the still image development processing is completed. Instead, such a message as "Processing in progress" may be displayed to notify the user of the current status.

Upon completion of the development processing, the control unit 101 instructs the image processing unit 111 to perform the encoding processing based on a predetermined encoding method for still image recording.

In step S222, the control unit 101 determines whether the development processing and the encoding processing of the still image are completed.

When the control unit 101 determines that the moving image data is not to be recorded (NO in step S206), the processing proceeds to step S230. In step S230, the control unit 101 instructs the imaging unit 110 to capture still image data.

In step S240, the control unit 101 instructs the image processing unit 111 to sequentially apply the development processing and the encoding processing to the digital image signal captured in step S230 to convert it into still image data.

Upon completion of the above-described development processing, the control unit 101 stores again the developed digital image data in the memory 104, and instructs the display control unit 131 to read the digital image data therefrom and display a relevant image on the display unit 130. This operation is what is referred to as the "Rec review" display for a digital camera with which a captured image is displayed on the display unit 130 immediately after shooting.

The display unit 130 displays no image (black screen) since the time when the still image shooting instruction is input until the time when the still image development processing is completed. Instead, such a message as "Processing in progress" may be displayed to notify the user of the current status.

Upon completion of the development processing, the control unit 101 instructs the image processing unit 111 to perform the encoding processing based on a predetermined encoding method for still image recording. In step S222, the control unit 101 determines whether the development processing and the encoding processing of the still image are completed.

When the control unit 101 determines that the still image encoding processing is completed (YES in step S222), the processing proceeds to step S223. In step S223, the control unit 101 transmits the generated still image data to the recording and reproduction unit 140 and records the still image data on the recording medium 141.

In step S224, the control unit 101 determines whether the user operates the operational unit 102 to input an instruction to exit the digest movie mode. When the digest movie mode is not to be ended (NO in step S224), the processing returns to step S201. In step S201, in parallel with the still image recording, the control unit 101 starts moving image shooting and encoding processing. In this case, the control unit 101 instructs the display control unit 131 to read the digital image signal stored in the memory 104 and display a through image again on the display unit 130.

As described above, the imaging apparatus 100 according to the present exemplary embodiment can record the moving image file and the still image file in the "digest movie mode."

The predetermined conditions used in step S206 will be described in detail below.

(1) A state where the scene mode remains unchanged since the moving image was last recorded in the "movie digest mode" is regarded as one of the predetermined conditions.

An exemplary case is that information about the scene mode selected in the "movie digest mode" remains unchanged. There are several scene modes such as a night scene mode, a portrait mode, and a sunset mode. When any one of these scene modes is set, the control unit 101 changes the diaphragm, shutter speed, etc. in the imaging unit 110 according to the selected scene mode. The control unit 101 further changes the ISO sensitivity, white balance, etc. in the image processing by the image processing unit 111 according to the selected scene mode.

In step S206, the control unit 101 determines whether the scene mode in which the moving image data last recorded on the recording medium 141 was captured is different from the current scene mode. When the control unit 101 determines that the selected scene mode remains unchanged, the moving image data is not to be recorded (NO in step S206). Otherwise, when the control unit 101 determines that the selected scene has changed, the moving image data is to be recorded (YES in step S206).

When the "movie digest mode" is set, the control unit 101 reads the last scene mode from the recording medium 141. For example, if information about the scene mode is recorded by being added to the moving image file including the moving image data last recorded in the "movie digest mode", the control unit 101 reads the information about the scene mode from the last recorded moving image file. As another method, while the user continues shooting without turning off the power, it is preferable to constantly store in the memory 104 the information about the scene mode used in the last shooting.

If the scene mode remains unchanged since the moving image data was last recorded in the "movie digest mode" as described above, the moving image data is not to be recorded.

Although the scene mode is determined based on the camera setting in the above description, it is also possible, for example, to analyze an image acquired by the imaging unit 110 to automatically detect the scene mode based on information about intensity of brightness, intensity of each color, and a focal position.

Although the present exemplary embodiment is described based on a case where the scene mode remains unchanged, it is also possible that the moving image is not to be recorded only in a specific scene mode. For example, it is possible that the moving image is not to be recorded only in the night scene mode and the sunset mode which are on the premise of scenic shots. On the other hand, the moving image may be recorded in the macro mode and the portrait mode.

The above-described processing can prevent similar scenic moving images from being repetitively reproduced.

(2) A state where a person currently being shot is identical to a person included in the moving image last recorded in the "movie digest mode" is regarded as one of the predetermined conditions.

An exemplary case is that the person included in the moving image last captured in the "movie digest mode" is identical to the person included in moving image acquired by the current shooting. Whether persons included in two different images are identical can be determined, for example, by analyzing the coincidence of contours the faces and the eyes and nose positions. The present exemplary embodiment uses a known method of personal identification, and therefore detailed explanations of the method will be omitted.

In step S206, the control unit 101 reads, for example, information for identifying a person included in the moving image data last recorded on the recording medium 141 or reads the moving image data itself to read personal feature information. Then, the control unit 101 analyzes the personal feature information included in the moving image data temporarily stored in the memory 104. When the two persons are determined to be identical, the control unit 101 determines not to record the moving image data (NO in step S206). Otherwise, when the two persons are not determined to be identical, the control unit 101 determines to record the moving image data (YES in step S206).

The above-described processing can prevent moving images including the same (similar) persons from repetitively being reproduced. The object to be analyzed is not limited to persons but may be animals.

(3) A state where a predetermined time period has not elapsed since when the moving image was last recorded in the "movie digest mode" is regarded as one of the predetermined conditions.

An exemplary case is that moving images are shot in succession within a preset time period, for example, within one minute or thirty seconds, since the captured moving image was last recorded in the "movie digest mode" is regarded as one of the predetermined conditions.

In step S206, the control unit 101 determines whether the preset time period has elapsed since when the moving image was last captured in the "movie digest mode." When the preset time period has not elapsed, the control unit 101 determines not to record the moving image data (NO in step S206). Otherwise, when the preset time period has elapsed, the control unit 101 determines to record the moving image data (YES in step S206).

This is because it is likely that moving image data pieces captured in a short time period shows almost the same (similar) scenes. The above-described processing can prevent moving images showing the similar scenes from being repetitively reproduced, and avoid making the viewer bored.

(4) A state where the moving image data temporarily stored in the memory 104 remains unchanged exceeding a predetermined degree is regarded as one of the predetermined conditions.

An exemplary case is that, as a result of analyzing the moving image data temporarily stored in the memory 104, the moving image data of the predetermined time length recorded on the recording medium 141 remains almost unchanged.

In step S206, the control unit 101 analyzes the moving image data temporarily stored in the memory 104. For example, the control unit 101 extracts a plurality of frames of moving images shown by the moving image data, and compares the images with each other. When a difference between images is smaller than a predetermined threshold value, the moving image data is not to be recorded (NO in step S206). Otherwise, when the difference between images is larger than the predetermined threshold value, the moving image data is to be recorded (YES in step S206).

In the present exemplary embodiment, the control unit 101 determines whether the moving image data has changed through the comparison of images. However, for example, if motion detection is performed when compressing the moving image data, it is also possible to determine whether the moving image data has changed by checking information about motion detection.

As described above, there are four main predetermined conditions.

In step S206, the control unit 101 may control the recording and reproduction unit 140 to check the maximum recordable capacity of the recording medium 141 to determine whether the moving image data temporarily stored in the memory 104 can be recorded on the recording medium 141.

This determination is made by determining whether the sum of the size of the moving image data temporarily stored in the memory 104 and an estimated size of the still image data to be recorded is smaller than the maximum recordable capacity of the recording medium 141. The estimated size of the still image data may be fixed, for example, to 4 MB or changed according to the recording size and the image quality.

Thus, when the control unit 101 determines that the moving image data and the still image data cannot be recorded on the recording medium 141, only still image shooting may be performed without recording the moving image data.

When the still image shooting instruction is input (YES in step S205), if only moving image data for a short time length, for example, less than one second or less than two seconds, is stored in the memory 104, the still image shooting instruction may be invalidated. This short time length may be set by the user.

If the moving image data temporarily stored in the memory 104 is extremely short, the above-described processing avoids recording the moving image data regardless of the time period elapsed since the last shooting. Such a situation arises, for example, when a plurality of still images is captured in response to the still image shooting instruction, i.e., in the continuous shooting mode.

More specifically, when continuous shooting is performed in response to the still image shooting instruction in the "movie digest mode", the moving image data corresponding to the first still image is recorded, but moving image data pieces corresponding to the second and subsequent still images are not recorded. Further, since moving image data is not recorded in the continuous shooting mode, not only moving image shooting but also the operation of temporarily storing moving image data in the memory 104 may be stopped, for example, until the continuous shooting mode is ended.

Assuming that, if user presses and holds down the shutter button for instructing still image shooting, continuous still image shooting is performed at predetermined intervals, a case where a button for instructing still image shooting remains set to ON is also regarded as one of the predetermined conditions. In this case, although continuous still image shooting is performed, moving image data corresponding to the first still image is recorded, but moving image data pieces corresponding to the second and subsequent still images are not recorded.

Although, in the present exemplary embodiment, the control unit 101 determines in step S206 whether the moving image data is to be recorded after the still image recording instruction is input, the determination may be made before the still image recording instruction is input. In this case, the control unit 101 determines in advance whether to record the moving image data and stores a result of the determination in the memory 104 or another memory (not illustrated). When the recording instruction is input, the control unit 101 records or does not record the moving image data according to the result of the determination.

A case where, in the "digest movie mode" according to the present exemplary embodiment, newly captured moving image data (new moving image data) is connected (added) to the moving image data of the moving image file already recorded on the recording medium 141 (existing moving image file) will be described below.

Figure 3:
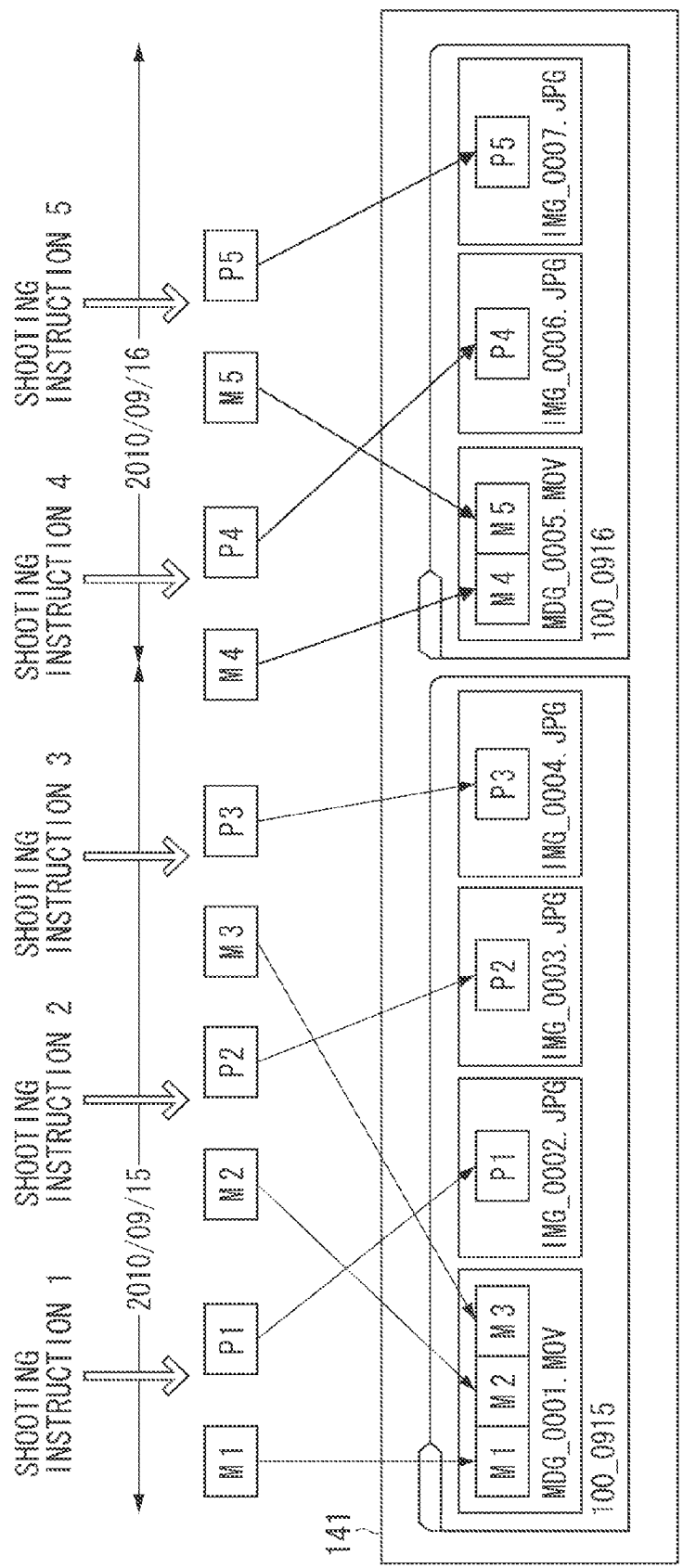
FIG. 3 illustrates states of still image and moving image files which are recorded in the movie digest mode.

For example, if it is assumed that moving image data pieces are connected when the recording date of the existing moving image file coincides with the acquisition date of the new moving image data (or the date setting of a camera at the time of shooting), moving image files and still image files are recorded as illustrated in FIG. 3.

Still image files P1, P2, and P3 having the same shooting date are recorded in the same single folder on the recording medium 141. Moving image data pieces M1, M2, and M3 stored in the memory 104 immediately before shooting each still image are recorded as one connected moving image file in the same folder.

Still image files P4 and P5 having a different shooting date from the still image files P1 to P3 are recorded in a different folder from the one in which the still image file P1 is recorded. In this case, even if the shooting date is changed in the middle of moving image data M4 stored in the memory 104 immediately before shooting the still image file P4, the control unit 101 performs control to record the moving image data M4 in the folder for the shooting date of the still image file P4. In other words, the control unit 101 determines whether the moving image data is to be connected or newly stored according to date information at the timing when a shooting instruction is input.

Although the present exemplary embodiment is described on the premise that a thumbnail image corresponding to the moving image data is generated each time the still image shooting instruction is input, the generation of a thumbnail is not limited thereto. For example, it is possible that a thumbnail image is generated for the moving image data M1, which is generated when still image data of the still image file P1 is captured, but not generated for the moving image data pieces M2 and M3 to be added. Thus, one thumbnail image can be generated for each moving image file.

Processing for connecting (adding) newly captured moving image data (new moving image data) to the moving image data of a moving image file already recorded on the recording medium 141 (existing moving image file) in the "digest movie mode" will be described in detail below. As described above, the control unit 101 determines whether the moving image data is to be connected (added) when the imaging apparatus 100 is activated, the digest movie mode is selected, or the still image recording instruction is input.

Although the moving image data connection processing is executed in step S221 in FIG. 2, a part of the processing may be executed in parallel with steps S222, S223, and S201 to S204, as described below.

FIG. 4 illustrates control operations performed by the imaging apparatus 100 to connect (add) the moving image data. FIGS. 5A, 5B, and 5C each illustrate a state of a moving image file in the recording medium 141, corresponding to each step in FIG. 4. The processing in FIG. 4 is executed when the control unit 101 controls each unit of the imaging apparatus 100.

In step S410, the control unit 101 first controls the recording and reproduction unit 140 to record in a free area on the recording medium 141 the moving image data of the predetermined time length stored in the memory 104 in step S202. Since the FAT is used as the file system, the control unit 101 records the moving image data in empty clusters based on a basic rule.

FIG. 5A illustrates a recording state of a specific moving image file on the recording medium 141 before the moving image data in the memory 104 is recorded on the recording medium 141. Referring to FIG. 5A, the moving image data of the specific moving image file is recorded in clusters 1 to 2, and a header of the specific moving image file is recorded in a cluster 3. The moving image file is recorded in the clusters 1 to 3 in this way.

Then, the cluster numbers are recorded in the FAT entry to indicate that the file data pieces are recorded in the FAT area in order of cluster numbers 3, 1, and 2. More specifically, "1" is recorded in the FAT entry of the cluster number 3, "2" is recorded in the FAT entry of the cluster number 1, and "FF" indicating the end of file is recorded in the FAT entry of the cluster number 2. Therefore, the specific moving image file can be read from the recording medium 141 by reading clusters in order of cluster numbers 3, 1, and 2.

FIG. 5B illustrates a recording state on the recording medium 141 after the moving image data of the predetermined time length stored in the memory 104 in step S410 is recorded on the recording medium 141. FIG. 5B illustrates a recording state on the recording medium 141 after the moving image data of the predetermined time length is recorded in clusters 4 and 5. In this state, as illustrated by the FAT entry in the FAT area, the moving image data of the predetermined time length is recorded in the clusters 4 and 5 and is different from the specific moving image file recorded in the clusters 1 to 3.

Processing in step S420 will be described below. Once the processing in step S410 is started, the processing in step S420 can be started even if the processing in step S410 is not completed.

After the moving image data of the predetermined time length stored in the memory 104 is being recorded, the control unit 101 analyzes the moving image data of the specific moving image file recorded on the recording medium 141 to identify a connecting position. In the present exemplary embodiment, the connecting position is set after the moving image data of the specific moving image file. In this processing, if the specific moving image file has a large size, reading and analyzing take a long time, and accordingly identifying a connecting position also takes a longer time.

In step S430, the control unit 101 controls the recording and reproduction unit 140 to update the FAT entry to connect (add) the moving image data of the predetermined time length recorded on the recording medium 141 to the specific moving image file. More specifically, as illustrated in FIG. 5C, the recording and reproduction unit 140 changes a state where the end of the specific moving image file is the cluster number 2 by correcting the FAT entry so that clusters 4 and 5 are read immediately after the cluster 2. More specifically, the recording and reproduction unit 140 updates the FAT entry of the cluster number 2 of the FAT from "FF" indicating the end of file to "4" so that the cluster 4, the start of the clusters in which new moving image data is recorded, is to be read.

In step S440, the control unit 101 reads the file header of the specific moving image file, edits the file header to add management information for new moving image data thereto, and records the file header on the recording medium 141. Such management information indicating which data in the moving image file corresponds to a starting position of a specific frame or specific GOP of the moving image will be recorded on the file header. FIG. 5C illustrates a recording state of the moving image file after completion of the above-described connection processing. The moving image file is composed of the cluster 1 to 5 recorded in order of the cluster number 3, 1, 2, 4, and 5. Then, the control unit 101 transfers control to step S222.

The processing in steps S420 to S440 may be executed in parallel with the processing in steps S222 and S223. Further, processing for temporarily storing the moving image data by the next shooting may be executed in parallel with the processing in steps S201 to S204. This is because, after completion of the processing in step S410, the moving image data stored in the memory 104 has already been recorded on the recording medium 141, and therefore the area of the memory 104 for temporarily storing moving image data is released. Once the area for temporarily storing the moving image data in the memory 104 is released, it becomes possible to start storing in the memory 104 the moving image data acquired in step S201.

In step S410, in response to an input of the shooting instruction, the control unit 101 of the imaging apparatus 100 according to the present exemplary embodiment controls the recording and reproduction unit 140 to record on the recording medium 141 the moving image data of the predetermined time length stored in the memory 104 before the shooting instruction is input. In step S420, after recording of the moving image data of the predetermined time length stored in the memory 104 is started, the control unit 101 analyzes the moving image data of the specific moving image file recorded on the recording medium 141 to identify a connecting position. Subsequently, the control unit 101 edits the FAT and header to edit the above-described specific moving image file so that the moving image data of the predetermined time length may be reproduced following the connecting position.

When connecting newly captured moving image data to the moving image data of an existing moving image file recorded on the recording medium 141, the imaging apparatus 100 according to the present exemplary embodiment can record on the recording medium 141 the new moving image data temporarily stored in the RAM 104 to release the moving image data storage area in the memory 104 before analyzing a connecting position of the existing moving image file. Accordingly, since it is possible to store the following moving image data in the moving image data storage area in the memory 104 before specifying the connecting position of the existing moving image file, the imaging apparatus can be ready for capturing next moving image data without taking a long time.

Although the imaging apparatus 100 according to the present exemplary embodiment basically adds new moving image data to the moving image data of the existing moving image file, the addition is not performed when any one of the following conditions is satisfied.

When the existing moving image file subjected to addition is protected

When a specific moving image file "MDG_000X.MOV" recorded on the recording medium 141 is protected, it is likely that the user does not want to modify the file, and therefore the addition is determined to be impossible.

When the file size exceeds a predetermined size after additional shooting

The recording medium 141 is managed by the FAT file system, as described above. In this case, for example, FAT32 cannot read a file having a size of 4 GB or more. Therefore, the addition is determined to be impossible if the size of "moving image file after addition" exceeds 4 GB after the next shooting.

When the GOP structure of the moving image of the existing moving image file subjected to addition is defective If the GOP structure is found to be defective as a result of checking a specific moving image file "MDG_000X.MOV" subjected to addition recorded on the recording medium 141, the moving image data to be added may be affected and therefore the addition is determined to be impossible.

When there is no existing moving image file subjected to addition

A moving image captured in the digest movie mode is assigned a file name "MDG_000X.MOV" which is composed of the "MDG" identifier and a 4-digit serial number. However, if there is no moving image having a file name including the "MDG" identifier, no moving image file captured in the digest movie mode exists and therefore the addition is determined to be impossible. The file name of the moving image file last recorded in the digest movie mode is recorded in a nonvolatile memory (not illustrated) of the imaging apparatus 100. When the file does not exist, the addition is determined to be impossible.

When the shooting date of the existing moving image file subjected to addition differs from the date setting in the imaging apparatus If moving image data captured on the same shooting date in the digest movie mode is sequentially added to, another moving image file will be recorded when the date is changed and therefore the addition is determined to be impossible.

When a region setting related to the existing moving image file subjected to addition is different from the region setting in the imaging apparatus If moving image data captured in the same region in the digest movie mode is sequentially added to, another moving image file will be recorded when the region is changed and therefore the addition is determined to be impossible. For example, the region information may be positional information acquired by a global positioning system (GPS) unit or the "country" information selected when clock setting is made on the imaging apparatus 100.

When information about the imaging apparatus related to the existing moving image file subjected to addition is different from that of the imaging apparatus for capturing new moving image data If only moving image data captured in the digest movie mode with an identical imaging apparatus is added to, the control unit 101 determines whether the identification information of the imaging apparatus related to the existing moving image file subjected to addition recorded on the recording medium coincides with that of the imaging apparatus for capturing image data. When the two pieces of identification information are different, the addition is determined to be impossible.

When moving image recording setting does not coincide with that of the existing moving image file subjected to addition If new moving image data is added to the existing moving image file as in the present exemplary embodiment, changing the frame rate, image size, GOP configuration, or moving image encoding method in the middle of the moving image may disable seamless reproduction. Therefore, when the moving image recording setting of the moving image data of the existing moving image file does not coincide with that of the new moving image data, the addition is determined to be impossible. Information such as the frame rate, image size, GOP configuration, and moving image encoding method is recorded on the file header of the existing moving image file.

When the audio recording setting does not coincide with that of the existing moving image file subjected to addition If new moving image data is added to the existing moving image file as in the present exemplary embodiment, changing the audio sampling rate, the number of channels, bit depth, or audio encoding method in the middle of the moving image may disable reproduction. Therefore, when the audio recording setting of the moving image data of the existing moving image file does not coincide with that of the new moving image data file, the addition is determined to be impossible. Information such as the audio sampling rate and audio encoding method is recorded on the file header of the existing moving image file.

When an insertion/removal history of the recording medium 141 remains in memory When the imaging apparatus 100 is activated, if a history of insertion/removal of the recording medium 141 after the last shooting in the continuous moving image shooting mode remains in a nonvolatile memory (not illustrated), the addition is determined to be impossible. This reduces the possibility that the moving image file "MDG_000X.MOV" recorded on the recording medium 141 is edited by a computer, the image size is changed, and then the moving image file itself is destroyed by the addition. Accordingly, the control unit 101 compares the shooting date information recorded on the file header of the existing file "MDG_000X.MOV" subjected to addition with the time information of the insertion/removal history remaining in the nonvolatile memory. With the added moving image file "MDG_000X.MOV", information about the first shooting time of the moving image data of a plurality of recorded scenes is recorded in the file header.

When the moving image reproduction time exceeds a predetermined time length after addition shooting With the imaging apparatus 100, in consideration of a case where the user does not want the shoot exceeding a predetermined time length (for example, 30 minutes), if the reproducing time of the moving image data of the "moving image file after addition" exceeds 30 minutes by newly shooting a moving image in the continuous moving image shooting mode, the addition is determined to be impossible. Accordingly, if the read reproducing time of the "moving image file after addition" recorded in the file header is, for example, 29 minutes and 58 seconds, the addition is determined to be impossible.

When the number of files in a folder storing the existing moving image file subjected to addition is equal to or greater than a predetermined number The imaging apparatus 100 records the number of still image files and moving image files to be recorded on the recording medium 141 based on a standard referred to as the design rule for camera file system (DCF). The DCF standard prescribes that up to 9999 files can be recorded in one folder. However, in the present exemplary embodiment, a new still image file is generated when shooting is made and therefore the still image file may not be recorded in a folder storing the existing moving image file subjected to addition. In this case, the related still image file and the existing moving image file subjected to addition are stored in different folders, making it difficult for the user to view the moving image afterwards. In such a case, therefore, the moving image is recorded as a new file in a new folder, not added to the existing moving image data. Although the maximum number of files is described as 9999, it may be 999, 900, or 100.

If the recording medium 141 or the existing moving image file is defective and normal check is not possible, the addition is determined to be impossible.

The present exemplary embodiment is described based on an imaging apparatus. The imaging apparatus may include a general compact digital camera, a digital single-lens reflex camera, a video camera, and a mobile phone. The technique according to the present invention is applicable not only to an imaging apparatus but also to a personal computer to which a camera is connected.

The above-described exemplary embodiment can also be implemented by software on a computer (or CPU, MPU, etc.) included in a system or an apparatus. Therefore, to implement the above-described exemplary embodiment by the computer, a computer program supplied to the computer also achieves the present invention. More specifically, the computer program for implementing the functions of the above-described exemplary embodiment is also a part of the present invention.

The computer program for achieving the above-described exemplary embodiment is provided in any form as long as it can be read by a computer. For example, the computer program may be an object code, an interpreter-executable program, or script data supplied to an operating system (OS). However, the form of the computer program is not limited thereto. The computer program for achieving the above-described exemplary embodiment can be supplied to a computer via a storage medium or wired/wireless communication. A storage medium for supplying the program may include, for example, a magnetic storage medium such as a flexible disk, a hard disk, and a magnetic tape, an optical/magneto-optical storage medium such as a magneto-optical disc (MO), a CD, and a DVD, or a nonvolatile semiconductor memory.

The computer program is supplied via wired/wireless communication, for example, by a server on a computer network. In this case, a data file (program file) serving as a computer program achieving the present invention is stored in the server. The program file may be either an executable code or a source code.

The computer program can be supplied as a program file downloaded to a client's computer which accesses the server. In this case, it is also possible to divide the program file into a plurality of segment files which are distributed to different servers. More specifically, the server apparatus for providing the client's computer with the program file for achieving the above-described exemplary embodiment is also a part of the present invention.

It is also possible to encrypt the computer program for achieving the above-described exemplary embodiment, distribute a storage medium storing the encrypted computer program, supply key information for decryption to a user who satisfies a predetermined condition, and permits installation of the program on a computer of the user. The key information can be supplied to the user, for example, by downloading it from a homepage through the Internet.

The computer program for achieving the above-described exemplary embodiment may use functions of the OS operating on a computer. The computer program for achieving the above-described exemplary embodiment may partly be configured by firmware such as an extension board installed in a computer, and may be executed by a CPU included in the expansion board.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation to encompass all modifications, equivalent structures, and functions.

This application claims the benefit of Japanese Patent Application No. 2011-021191 filed Feb. 2, 2011, which is hereby incorporated by reference herein in its entirety.

What is claimed is:

1. An imaging pickup apparatus comprising:
   an imaging pickup unit that captures an image of a subject;
   a still image generator that generates still image data based on an image captured by the imaging pickup unit;
   a moving image generator that generates moving image data based on an image captured by the imaging pickup unit; and a control unit that performs control, in response to a recording instruction of a still image, to record, on a recording medium, still image data generated by the still image generator, and to record, on the recording medium, moving image data of a predetermined time length, wherein the moving image data is generated by the moving image generator, wherein the control unit performs control, in a case where a predetermined condition is satisfied, in response to the recording instruction of the still image, not to record, on the recording medium, the moving image data of the predetermined time length and to record the still image data on the recording medium, and wherein the control unit performs control to record, in [[a]] one moving image file, a plurality of moving image data pieces each having a predetermined time length and corresponding to respective recording instructions of still images, the plurality of moving image data pieces to be recorded on one moving image file each correspond to a different recording instruction of a still image.

2. The imaging pickup apparatus according to claim 1:
wherein, in response to an input of the recording instruction of the still image, the control unit determines whether the predetermined condition is satisfied.

3. The imaging pickup apparatus according to claim 1, wherein the control unit determines whether the predetermined condition is satisfied before the recording instruction of the still image is input.

4. The imaging pickup apparatus according to claim 1, wherein the predetermined condition is any one of the following:
a case where information about a scene mode of moving image data when the recording instruction of the still image is input and information about a scene mode of moving image data when moving image data last recorded on the recording medium has been captured are the same;
a case where moving image data to be recorded in response to the recording instruction of the still image remains unchanged when exceeding a predetermined degree;
a case where a person included in moving image data is the same person included in moving image data last recorded on the recording medium; and
a case where a predetermined time period has not elapsed since moving image data was last recorded on the recording medium.

5. The imaging pickup apparatus of claim 1, further comprising a memory that temporarily stores the moving image data generated by the moving image generator,
wherein the control unit analyzes the moving image data stored in the memory to determine whether the predetermined condition is satisfied.

6. The imaging pickup apparatus according to claim 1, wherein the control unit performs control to record the moving image data and the still image data in the same folder.

7. The imaging pickup apparatus of claim 1, further comprising a temporary storage unit that temporarily stores moving image data generated by the moving image generator,
wherein the control unit performs control, in response to the recording instruction of the still image, to record moving image data temporarily stored in the temporary storage unit on the recording medium.

8. The imaging pickup apparatus of claim 1, wherein the control unit performs control to record, in a moving image file, a plurality of moving image data pieces generated on a same shooting date.

9. The imaging pickup apparatus of claim 1, wherein the predetermined condition is a case where information about a scene mode of moving image data when the recording instruction of the still image is input and information about a scene mode of moving image data when moving image data last recorded on the recording medium has been captured are the same.

10. The imaging pickup apparatus of claim 1, wherein the predetermined condition is a case where moving image data to be recorded in response to the recording instruction of the still image remains unchanged in a predetermined degree or more.

11. The imaging pickup apparatus of claim 1, wherein the predetermined condition is a case where a person included in moving image data is the same person included in moving image data last recorded on the recording medium.

12. The imaging pickup apparatus of claim 1, wherein the predetermined condition is a case where a predetermined time period has not elapsed since moving image data has been last recorded on the recording medium.

13. A method for controlling an imaging pickup apparatus including an imaging pickup unit that captures an image of a subject, a still image generator that generates still image data based on an image captured by the imaging pickup unit, a moving image generator that generates moving image data based on an image captured by the imaging pickup unit, the method comprising:
controlling, in response to a recording instruction of a still image, to record, on a recording medium, still image data generated by the still image generator, and to record, on the recording medium, moving image data of a predetermined time length, wherein the moving image data is generated by the moving image generator,
wherein the controlling performs control, in a case where a predetermined condition is satisfied when the recording instruction of the still image is input, not to record, on the recording medium, the moving image data of the predetermined time length and to record the still image data on the recording medium in response to the recording instruction of the still image, and
wherein the controlling performs control to record, in one moving image file, a plurality of moving image data pieces each having a predetermined time length and corresponding to respective recording instructions of still images, the plurality of moving image data pieces to be recorded on one moving image file each correspond to a different recording instruction of a still image.

* * * * *